Figure 1:
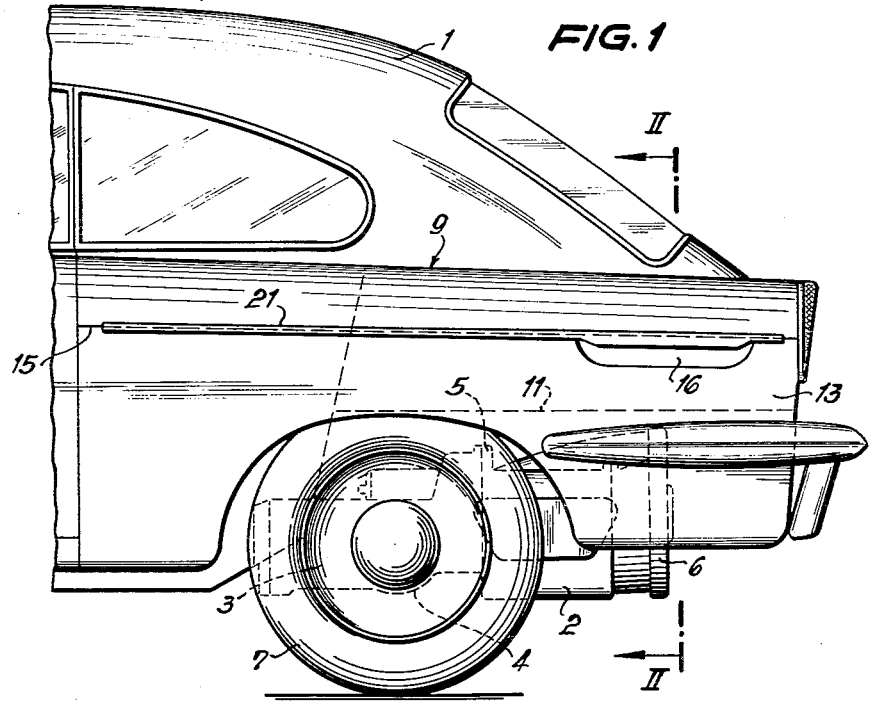

Dec. 5, 1961  E. KOMENDA  3,011,577
COOLING-AIR GUIDE SYSTEM FOR MOTOR VEHICLES
Filed Feb. 12, 1959  2 Sheets-Sheet 1

INVENTOR
ERWIN KOMENDA
BY Dicke, Craig + Freudenberg
ATTORNEYS

Dec. 5, 1961          E. KOMENDA          3,011,577

COOLING-AIR GUIDE SYSTEM FOR MOTOR VEHICLES

Filed Feb. 12, 1959          2 Sheets-Sheet 2

INVENTOR
ERWIN KOMENDA
BY Dicke, Craig & Freudenberg
ATTORNEYS

United States Patent Office  
3,011,577  
Patented Dec. 5, 1961

3,011,577
COOLING-AIR GUIDE SYSTEM FOR MOTOR VEHICLES
Erwin Komenda, Stuttgart, Germany, assignor to Firma Dr.-Ing. h.c. F. Porsche K.G., Stuttgart-Zuffenhausen, Germany
Filed Feb. 12, 1959, Ser. No. 792,893
Claims priority, application Germany Mar. 1, 1958
9 Claims. (Cl. 180—54)

The present invention relates to a cooling-air guide system for motor vehicles provided with a luggage space or compartment adjacent to the wheel housing and with the drive aggregate or unit arranged below the luggage compartment, whereby the wheel housing is covered toward the outside thereof by a lateral wall which is so secured at the vehicle body or superstructure of the vehicle as to be either completely detachable therefrom or partly detachable therefrom, i.e., whereby either the entire lateral wall of the wheel housing or a part thereof is detachable from the vehicle body or the superstructure of the vehicle which may include the wheel housing.

Cooling-air guide systems for driving aggregates or units arranged in the vehicle rear part are known in the prior art in which the air is conducted to the engine space through air scoop pockets arranged at the fenders.

Furthermore, constructions are known in the prior art in which an offset or stepped portion is provided in the vehicle body side wall in front of the rear fender for purposes of admitting the cooling air. However, these air inlet apertures provided and positioned in the direction of flow of the air result in a considerable increase in the air resistance and prevent a smooth adhesion of the air along the vehicle rear part. Furthermore, the relatively low location of the air inlet apertures favors the admission of soiled air or air which is relatively impure.

It has also been already proposed in the prior art to conduct the required cooling and combustion air through a double-walled lid or cover below the luggage compartment floor to the drive aggregate. Even though such a construction has an air inlet location which is disposed relatively high above the road surface, it entails the disadvantage that the engine noises are transmitted by means of the lid or cover and are thereby noticeable to an increased extent in the passenger space. Furthermore, this type of air guide system tends toward droning.

According to the present invention the disadvantages encountered in the prior art are avoided by utilizing a part of the separating gap or separating joint extending essentially horizontally between the detachable side wall and the wheel housing to serve as air inlet aperture. As a result of such a construction the favorable streamlined shape and contour of the vehicle is not disturbed or interrupted so that any undesirable increase in air resistance is precluded.

Furthermore, relatively short guide paths for the air are obtained thereby, in addition to the advantage that the cooling air guide system does not adjoin the passenger space, i.e., does not use or adjoin walls forming the boundary walls for the passenger space. Any transmission of noise is also effectively prevented thereby.

The arrangement according to the present invention is preferably so selected that the detachable part of the side wall is provided with an indented portion increasing the cross-section thereof within the region of the air inlet aperture. The flow of air therethrough thereby fully satisfies the required demands of the unit.

The air inlet aperture is continued in or passes over into the air guide system which is formed by the floor of the luggage compartment and a sheet metal plate arranged at a distance therefrom. As a result thereof parts are used in the present invention for the formation of the air guide system which are already present in the vehicle so that the manufacturing costs thereof are relatively slight.

A particularly simple construction is obtained in accordance with the present invention if the luggage compartment floor extends up to the outer side wall of the wheel housing in an essentially rectilinear manner without angular bends or offset portions and if the sheet metal closure member is formed in one piece with the detachable part of the side wall. The securing of the detachable side wall takes place by means of elastic spacer members. The separating joint or gap between the detachable side wall and the wheel housing is appropriately covered by a decorative strip. Consequently, the separating gap or joint does not disturb the general contour of the outer surface of the vehicle.

Accordingly, it is an object of the present invention to provide an air cooling system, particularly for air-cooled internal combustion engines of motor vehicles which is simple in structure, inexpensive in manufacture and assembly, and which does not impair the streamlining of the motor vehicle.

Another object of the present invention resides in the provision of simply-constructed and highly effective air inlet apertures for the cooling air guide system of motor vehicles.

Still another object of the present invention is the provision of a cooling air guide system for air-cooled internal combustion engines of motor vehicles, particularly rear engine vehicles in which the engine is disposed below the floor of the luggage compartment, which minimizes the danger of the presence of impurities in the cooling air and which at the same time prevents the transmission of noises caused by the flow of cooling air to the passenger compartment.

A still further object of the present invention is the provision of a simple, inexpensive and effective air cooling system for motor vehicles which minimizes the danger of droning.

These and other objects, features, and advantages of the present invention will become more obvious from the following description when taken in connection with the accompanying drawing which shows, for purposes of illustration only, two embodiments in accordance with the present invention, and wherein—

Figure 2:
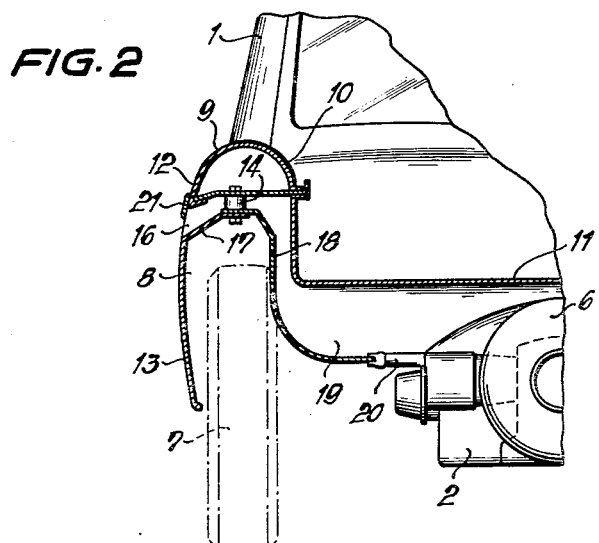
Figure 3:
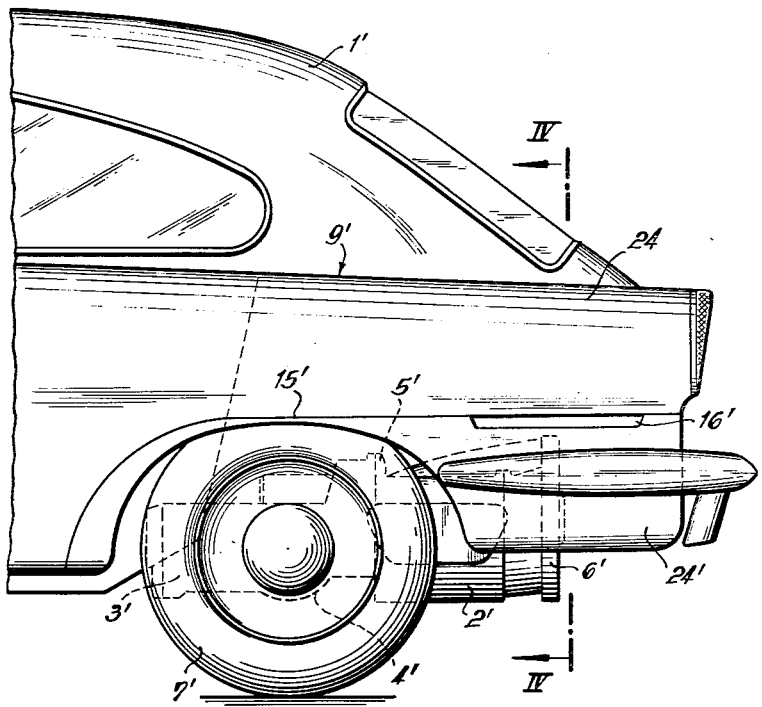
Figure 4:
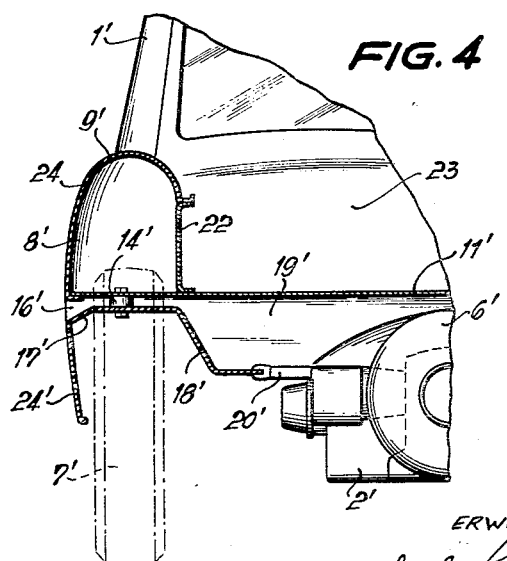

FIGURE 1 is a partial side view of the rear portion of a motor vehicle provided with a cooling air guide system in accordance with the present invention, FIGURE 2 is a partial cross-sectional view taken along line II—II of FIGURE 1 in which, for purposes of simplicity, only one vehicle side has been shown, FIGURE 3 is a partial side view of the rear part of a motor vehicle provided with a modified embodiment of a cooling air system in accordance with the present invention, and FIGURE 4 is a partial cross-sectional view taken along line IV—IV of FIGURE 3 showing again only one half of the vehicle side for reasons of simplicity.

Referring now to the drawing wherein like reference numerals are used throughout the various views to designate corresponding parts, and more particularly to FIGURES 1 and 2 thereof, a drive aggregate or drive unit generally designated by reference numeral 5 and including an internal combustion engine 2, a change speed gear 3, and an axle gear 4 is arranged in the rear part of the motor vehicle body 1. The internal combustion engine 2 is air-cooled and carries at the end thereof a cooling air blower 6. The axle gear 4 drives the rear wheels 7 in any conventional manner which wheels are each surrounded by a wheel housing 8. Since both sides of the vehicle body are constructed in an identical mirror-image-like manner, only one side, namely the left vehicle side, will be described and referred to in detail hereinafter.

The wheel housing 8 surrounding the rear wheel 7 is provided with a crown or top portion 9 secured to the vehicle body which is secured on the inwardly disposed side 10 thereof to the luggage compartment floor 11 arranged above the internal combustion engine 2. The outer side 12 of the wheel housing 8 forms the side wall 13 of the vehicle body. The side wall 13 of the vehicle body is detachably secured at the crown or top portion 9 of the wheel housing 8 within the region opposite air inlet aperture 16 by the interposition of elastic spacer members 14, the side wall extending up to the door post in a manner known per se. The essentially horizontally extending separating joint or gap 15 which results from this connection is constructed within the region above the cooling air blower 6 as air inlet aperture 16. For that purpose, the side wall 13 is provided with an indented portion 17 (FIGURE 2) which is bent back again at the each respective end of the air inlet aperture 16 to provide thereby the normal width of the separating joint 15 thereat. A sheet metal closure member 18 adjoins or is connected to the indented portion 17 of the side wall 13 which sheet metal closure member 18 extends at a distance from the luggage compartment floor 11 and forms, together with the latter, an air duct or channel 19. The sheet metal closure member 18 terminates in a plate member 20, i.e., is inserted in a groove or channel provided in such plate member 20 which thereby effectively seals off the internal combustion engine 2 against the road surface. The separating joint or gap 15 is appropriately covered by a decorative ledge or decorative strip 21.

During operation of the internal combustion engine 2, the air flowing along the vehicle enters through the inlet aperture 16 into the air channel or duct 19, is drawn-in thereat by the cooling blower 6 and subsequently forced against the cylinders of the internal combustion engine 2 which are cooled thereby. Furthermore, the combustion air is also taken off from the air excess present in channel 19.

FIGURES 3 and 4 illustrate an embodiment in which the detachable side wall part is kept relatively smaller as compared to the embodiment described hereinabove in connection with FIGURES 1 and 2. The same parts are again designated with the same reference numerals, however, primed reference numerals are used in connection with FIGURES 3 and 4 to designate corresponding parts of FIGURES 1 and 2.

A drive aggregate 5' consisting of an internal combustion engine 2', the change speed gear 3' and the axle gear 4' is again arranged in the rear portion of the vehicle body 1'. The internal combustion engine 2' is cooled by means of a blower 6' and drives the rear wheels 7' by means of the axle gear 4' which wheels are each surrounded by wheel housings 8'. The crown or top portion 9' of the wheel housing 8' is connected to the boundary wall 22 of the luggage compartment 23. The boundary wall 22 of any suitable shape is thereby supported on the luggage compartment floor 11'. The luggage compartment floor 11' is extended in an essentially rectilinear manner without any angularly bent or stepped portions up to the fixedly secured vehicle side wall 24 and is secured thereat in any suitable manner. The detachable part 24' of the side wall 24 is essentially limited to the region of the location of the wheel and is made in one piece with the sheet metal closure member 18' adjoining and secured to the sealing plate 20' of the internal combustion engine 2'. The side wall part 24' is also secured by means of elastic spacer members 14' to the extended luggage compartment floor 11' within the region opposite air inlet aperture 16'. The separating joint or gap 15' between the parts 24 and 24' again is provided with an indented portion which serves as air inlet aperture 16' which is continued in the cooling air channel or duct 19' formed by the luggage compartment floor 11' and the sheet metal closure member 18'.

The embodiment described with reference to FIGURES 3 and 4 distinguishes itself with respect to the embodiment and construction of FIGURES 1 and 2 by a lesser cost in manufacture thereof. Since the manner of the guidance of the cooling air in FIGURES 3 and 4 is the same as in FIGURES 1 and 2, a detailed description thereof is dispensed with herein.

While I have shown and described two embodiments in accordance with the present invention, it is understood that the same is not limited thereto but is susceptible of many changes and modifications within the spirit and scope of the present invention, and I, therefore, do not wish to be limited to the details described hereinabove and illustrated in the drawing but intend to cover all such changes and modifications as are encompassed by the scope of the appended claims.

I claim:

1. A cooling-air guide system for a drive unit of a motor vehicle having a vehicle body forming a luggage space defined in part by a luggage space floor member, said drive unit being located below said luggage space and underneath said luggage space floor member, comprising a plurality of wall portions in said vehicle body including side wall means and other wall portions, said side wall means having a detachable side wall portion and at least one other side wall portion, wheel housing means formed by said vehicle body adjacent said luggage space and covered on the outside thereof by said detachable side wall portion and the other side wall portion forming therebetween a separating joint constituting in part an air inlet aperture, and connecting means effectively forming an air duct and including said luggage space floor member and another member extending at a distance therefrom operatively connecting said air inlet aperture with said drive aggregate to effectively conduct air from the former to the latter.

2. A cooling-air guide system for motor vehicles according to claim 1, further comprising means for readily detachably connecting said detachable side wall portion with the remainder of the vehicle body.

3. A cooling-air guide system for motor vehicles according to claim 1, wherein said side wall means is provided with an indented portion within the region of said air inlet aperture to increase the cross-section thereof.

4. A cooling-air guide system for motor vehicles according to claim 1, wherein said luggage space floor member is extended in an essentially rectilinear manner up to the outer side wall of said wheel housing means, and wherein said sheet metal closure member is made in one piece with the detachable portion of said side wall means.

5. A cooling-air guide system for motor vehicles according to claim 4, further comprising means including elastic spacer means for detachably securing said detachable side wall portion at the remainder of the vehicle body.

6. A cooling-air guide system for motor vehicles according to claim 1, wherein said luggage space floor member extends in an essentially rectilinear manner without angular bends up to said detachable side wall portion.

7. A cooling-air guide system for motor vehicles according to claim 6, further comprising elastic spacer means for detachably connecting said detachable side wall means with said vehicle body.

8. A cooling-air guide system for motor vehicles according to claim 1, further comprising decorative strip means to cover said separating joint formed between said detachable side wall means and said wheel housing means.

9. A cooling-air guide system for motor vehicles having a luggage space defined by body panels and a drive aggregate located below said luggage space, a vehicle body having a plurality of body portions including side wall means, wheel housing means constituted by several of said body portions, one of said body portions forming part of said vehicle side wall means being detachable with respect to another body portion which is relatively fixed and also forms part of the vehicle body side wall means, means detachably securing said detachable body portion with respect to said relatively fixed body portion, said two body portions forming a separating joint therebetween, an air inlet aperture provided in said separating joint, and duct means formed at least in part by said detachable body portion and some of said body panels defining said luggage space for directly conducting the air from said air inlet aperture to said drive unit.

References Cited in the file of this patent

UNITED STATES PATENTS

| | | |
|---|---|---|
| 2,175,527 | Klavik | Oct. 10, 1939 |
| 2,204,926 | Clingerman | June 18, 1940 |
| 2,237,369 | Seyerle | Apr. 8, 1941 |

FOREIGN PATENTS

| | | |
|---|---|---|
| 1,110,960 | France | Oct. 19, 1955 |